(12) United States Patent
Inoue et al.

(10) Patent No.: US 12,513,047 B2
(45) Date of Patent: Dec. 30, 2025

(54) CONNECTION OPTIMIZATION DEVICE, CONNECTION OPTIMIZATION METHOD, AND PROGRAM

(71) Applicant: NTT, Inc., Tokyo (JP)

(72) Inventors: Takeru Inoue, Musashino (JP); Toru Mano, Musashino (JP); Kazuya Anazawa, Musashino (JP); Hideki Nishizawa, Musashino (JP)

(73) Assignee: NTT, Inc., Tokyo (JP)

( * ) Notice: Subject to any disclaimer, the term of this patent is extended or adjusted under 35 U.S.C. 154(b) by 326 days.

(21) Appl. No.: 18/266,342

(22) PCT Filed: Dec. 9, 2020

(86) PCT No.: PCT/JP2020/045853
§ 371 (c)(1),
(2) Date: Jun. 9, 2023

(87) PCT Pub. No.: WO2022/123686
PCT Pub. Date: Jun. 16, 2022

(65) Prior Publication Data
US 2024/0048443 A1 Feb. 8, 2024

(51) Int. Cl.
*H04L 12/66* (2006.01)
*H04L 41/0823* (2022.01)
(Continued)

(52) U.S. Cl.
CPC ........ *H04L 41/0823* (2013.01); *H04L 41/142* (2013.01); *H04Q 11/0062* (2013.01)

(58) Field of Classification Search
CPC ....... H04Q 11/0005; H04Q 2011/0058; H04Q 2011/0052; H04Q 2011/0041;
(Continued)

(56) References Cited

U.S. PATENT DOCUMENTS 6,542,268 B1 * 4/2003 Rotolo ............... H04J 14/0217
370/216
6,792,174 B1 * 9/2004 Ramaswami ....... H04J 14/0297
385/24
(Continued)

FOREIGN PATENT DOCUMENTS

JP 6737747 8/2020

OTHER PUBLICATIONS

Mano et al., "Increasing Capacity of the Clos Structure for Optical Switching Networks," 2019 IEEE Global Communications Conference (Globecom), Dec. 2019, 7 pages.

*Primary Examiner* — Kharye Pope
(74) *Attorney, Agent, or Firm* — Fish & Richardson P.C.

(57) ABSTRACT

A connection optimization device that optimizes connections between a plurality of FXC switches for switching connections of optical fibers includes a optimization unit for receiving, as inputs, a number k of FXC switches, a number n of sending/receiving ports, and a connection probability matrix C of the sending/receiving ports and swapping rows and columns of the connection probability matrix C so as to maximize an expected value D in which a connection probability using a short path connecting between the sending/receiving ports connected in the same FXC switch becomes the largest, and a swapping port information output unit for outputting difference information between the connection probability matrix C and the optimization matrix C* in which the rows and the columns are swapped by the optimization unit.

4 Claims, 10 Drawing Sheets

(51) Int. Cl.
*H04L 41/142* (2022.01)
*H04Q 11/00* (2006.01)

(58) Field of Classification Search
CPC ........... H04Q 1/145; H04Q 2011/0056; H04Q 11/0001; H04Q 11/0067; H04Q 2213/1301; H04Q 2201/804; G02B 6/356; G02B 6/3556; G02B 6/3512; G02B 6/43; G02B 6/3518; H04J 14/0293; H04J 14/0297; H04J 14/0212; H04L 49/1515
See application file for complete search history.

(56) References Cited

U.S. PATENT DOCUMENTS

| | | | |
|---|---|---|---|
| 6,871,021 B2* | 3/2005 | Graves | H04Q 11/0005 398/16 |
| 2015/0098698 A1* | 4/2015 | Kewitsch | G02B 6/3504 398/45 |
| 2019/0212545 A1* | 7/2019 | Gong | G02B 6/356 |

* cited by examiner

$$C = \begin{array}{c} \\ t_1^1 \\ t_2^1 \\ t_1^2 \\ t_2^2 \end{array} \begin{array}{cccc} r_1^1 & r_2^1 & r_1^2 & r_2^2 \\ \left[\begin{array}{cccc} 0.49 & 0.49 & 0.01 & 0.01 \\ 0.49 & 0.49 & 0.01 & 0.01 \\ 0.01 & 0.01 & 0.49 & 0.49 \\ 0.01 & 0.01 & 0.49 & 0.49 \end{array}\right] \end{array}$$

CONNECTION OPTIMIZATION DEVICE, CONNECTION OPTIMIZATION METHOD, AND PROGRAM

CROSS-REFERENCE TO RELATED APPLICATIONS

This application is a National Stage application under 35 U.S.C. § 371 of International Application No. PCT/JP2020/045853, having an International Filing Date of Dec. 9, 2020, the disclosure of which is considered part of the disclosure of this application, and is incorporated by reference in its entirety into this application.

TECHNICAL FIELD

The present invention relates to a connection optimization device, a connection optimization method, and a program for optimizing each connection between a plurality of optical fiber cross-connects (referred to FXC switch below) for switching connection of optical fiber cables (referred to optical fiber below).

BACKGROUND ART

A wiring of optical fibers is a troublesome work, but is an indispensable work to provide a high-speed and robust network service. The operation cost of the wiring work of the optical fibers in a communication building in which a large number of FXC switches are arranged is high. The reason is that the work requires preparing a work procedure manual, dispatching an operator to both ends of the optical fiber, confirming signal communication and power level, and dispatching a manager.

The FXC switch in the communication building is roughly divided into an FXC switch of an input/output layer to which the optical fibers of users are directly connected and an FXC switch of an intermediate layer for folding back the wiring of the optical fibers in the communication building. The smaller the number of FXC switches in the intermediate layer through which the optical fiber lines pass in the communication building, the lower the network cost.

As a method for improving the accommodation efficiency of the optical fiber lines in the communication building, for example, a method disclosed in PTL 1 has been known. In addition, a method disclosed in NPL 1 has been known.

CITATION LIST

Patent Literature

[PTL 1] Japanese Patent No. 6737747

Non Patent Literature

[NPL 1] T. Mano, T. Inoue, K. Mizutani, and O. Akashi, "Increasing capacity of the Clos structure for optical switching networks", in 2019 IEEE Global Communications Conference (GLOBECOM), 2019, pp. 1-6

SUMMARY OF INVENTION

Technical Problem

However, as the number of users increases, the number of FXC switches in the intermediate layer increases, and thus there has been a problem that the net cost increases.

The present invention has been made in view of the above problem, and an object of the present invention is to provide a connection optimization device, a connection optimization method, and a program capable of reducing the number of FXC switches in an intermediate layer and suppressing a network cost.

Solution to Problem

A connection optimization device according to an aspect of the present invention is a connection optimization device that optimizes connections between a plurality of FXC switches for switching connections of optical fibers, and includes: an optimization unit for receiving, as inputs, a number of the FXC switches, a number of sending/receiving ports and a connection probability matrix of the sending/receiving ports and swapping rows and columns of the connection probability matrix so as to maximize an expected value in which a connection probability using a short path connecting between the sending/receiving ports connected in the same FXC switch becomes the largest; and a swapping port information output unit for outputting difference information between the connection probability matrix and an optimization matrix in which the rows and the columns are swapped in the optimization unit.

A connection optimization method according to an aspect of the present invention is a connection optimization method that optimizes connections between a plurality of FXC switches executed by a connection optimization device, and includes: a optimization step of receiving, as inputs, a number of the FXC switches, a number of sending/receiving ports and a connection probability matrix of the sending/receiving ports and swapping rows and columns of the connection probability matrix so as to maximize an expected value in which a connection probability using a short path connecting between the sending/receiving ports connected in the same FXC switch becomes the largest; and a swapping port information output step of outputting difference information between the connection probability matrix and an optimization matrix in which the rows and the columns are swapped in the optimization step.

Further, a program according to an aspect of the present invention is a program for causing a computer to function as the above mentioned connection optimization device.

Advantageous Effects of Invention

According to the present invention, the number of FXC switches in the intermediate layer can be reduced, and thus the net cost can be suppressed.

BRIEF DESCRIPTION OF DRAWINGS

FIG. 3 is a diagram showing an example of a connection probability matrix C of two pairs of sending/receiving ports.

FIG. 4 is a diagram showing an example of the connection probability matrix C in which connection probabilities shown in FIG. 3 are swapped.

DESCRIPTION OF EMBODIMENTS

Figure 1:
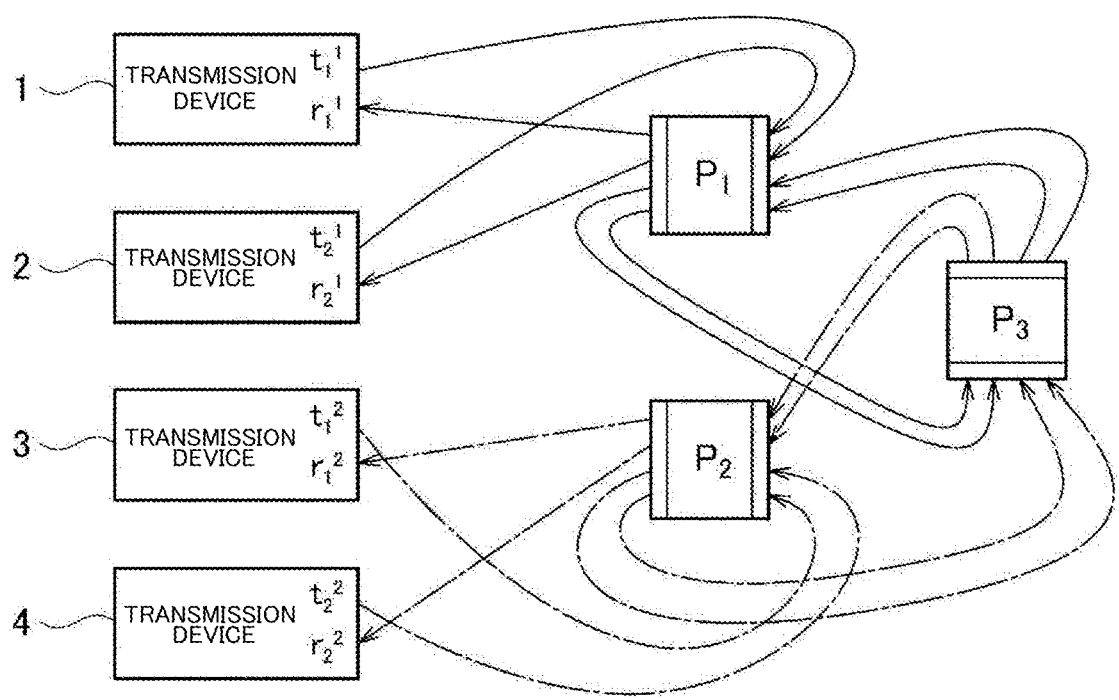
FIG. 1 is a schematic diagram showing an example of a target network topology to which a connection optimization device according to embodiments of the present invention is applied.

Embodiments of the present invention will be described below with reference to the drawings. The same elements in a plurality of drawings are given the same reference numerals in order not to repeat description.

Before describing the embodiments, a target network topology using a connection optimization device according to the present embodiment will be described.

Network Topology

FIG. 1 is a schematic diagram showing an example of a target network topology to which a connection optimization device according to embodiments of the present invention is applied. The network topology shown in FIG. 1 shows an example of a simple configuration for convenience of explanation.

FXC switches $P_1$, $P_2$, $P_3$ shown in FIG. 1 are arranged in a communication building (not shown). Each of transmission devices 1 to 4 may be arranged in the communication building or outside. The transmission devices 1 to 4 are devices for transmitting optical signals between users or between users and a communication carrier.

$t_h^g$ represents a sending port. h represents a sending port number, and g represents an FXC switch number. $r_j^i$ represents a receiving port. j is a receiving port number, and i represents an FXC switch number.

A sending port $t_2^2$ of the transmission device 4 is connected to a receiving port rig of the transmission device 3 via an FXC switch $P_2$ of an input/output layer, an FXC switch $P_3$ of an intermediate layer, an input layer switch $P_2$, and the FXC switch $P_3$ of the intermediate layer. Further, a sending port $t_1^2$ of the transmission device 3 is connected to a receiving port $r_2^2$ of the transmission device 4 via the FXC switch $P_2$ of the input/output layer, the FXC switch $P_3$ of the intermediate layer, a switch $P_1$ of the input layer, the switch $P_3$ of the intermediate layer and the FXC switch $P_2$ of the input layer.

A sending port $t_1^1$ of the transmission device 1 is connected to a receiving port $r_2^1$ of the transmission device 2 only via the FXC switch $P_1$ of the input layer. Further, a sending port $t_2^1$ of the transmission device 2 is connected to the receiving port $r_2^1$ of the transmission device 2 via the switch P1 of the input layer.

The connection optimization device according to the present embodiment is a device which acts to increase a path of a short line not passing through the intermediate layer switch, such as the transmission port $t_1^1$ of the transmission device 1 or the transmission port $t_2^1$ of the transmission device 2. The path of the short line is hereinafter referred to as "short path".

First Embodiment

Figure 2:
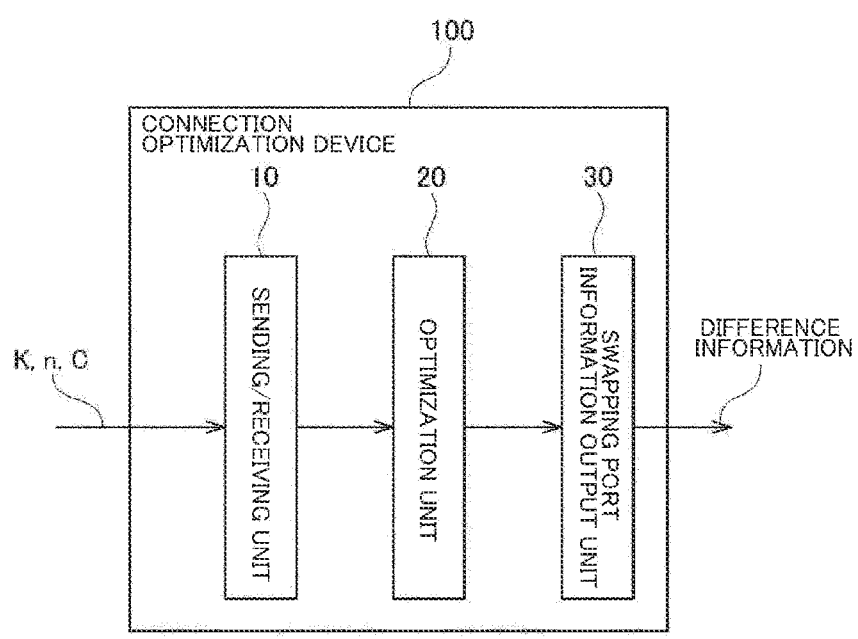
FIG. 2 is a block diagram showing a function configuration example of the connection optimization device according to a first embodiment of the present invention.

FIG. 2 is a block diagram showing a function configuration example of the connection optimization device according to the first embodiment of the present invention. The connection optimization device 100 shown in FIG. 2 includes a sending/receiving unit 10, an optimization unit 20, and a swapping port information output unit 30. The connection optimization device 100 is a device for allocating a sending/receiving port of the transmission device to the FXC switch so as to maximize the connection probability of the "short path".

The sending/receiving unit 10 receives the number k of FXC switches in the communication building, the number n of sending/receiving ports (n is a pair of numbers of transmitting and receiving), and a connection probability matrix C of the sending/receiving ports from a network manager side. The connection probability matrix C is a matrix in which the sending port $t_h^g$ is a column, the receiving port $r_j^i$ is a row, and each element is expressed by the connection probability.

The connection probability matrix C is estimated from past data by the network manager. Further, the connection probability matrix C may be a matrix expressed by the actual connection probability of the network in operation.

The connection probability c between the sending port $t_h^g$ and the receiving port $r_j^i$ is expressed by expression (1), and the connection probability matrix C is expressed by expression (2).

[Math. 1]

$$c_{hj}^{gi}(0 \le c_{hi}^{gi} \le 1) \tag{1}$$

$$C = \{c_{hi}^{gi}\} \tag{2}$$

In the expression (1), when g=i is satisfied, the sending port $t_h^g$ and the receiving port $r_j^i$ are accommodated in the same FXC switch. That is, the probability of setting the short path is obtained.

The probability in which the sending port $t_h^g$ is connected to the receiving port $r_j^i$ of the same FXC switch is expressed by the following expression.

[Math. 2]

$$\Sigma_{j=1}^n c_{hj}^{gg} \tag{3}$$

Therefore, the expected value of the number of short paths set in the FXC switch g is expressed by the expression (4), and the expected value D of the number of short paths in the entire network configuration in the communication building is expressed by the following expression.

[Math 3]

$$D = \sum_{g=1}^{k}\sum_{h=1}^{n}\sum_{j=1}^{n} c_{hj}^{gg} \tag{4}$$

Figure 3:
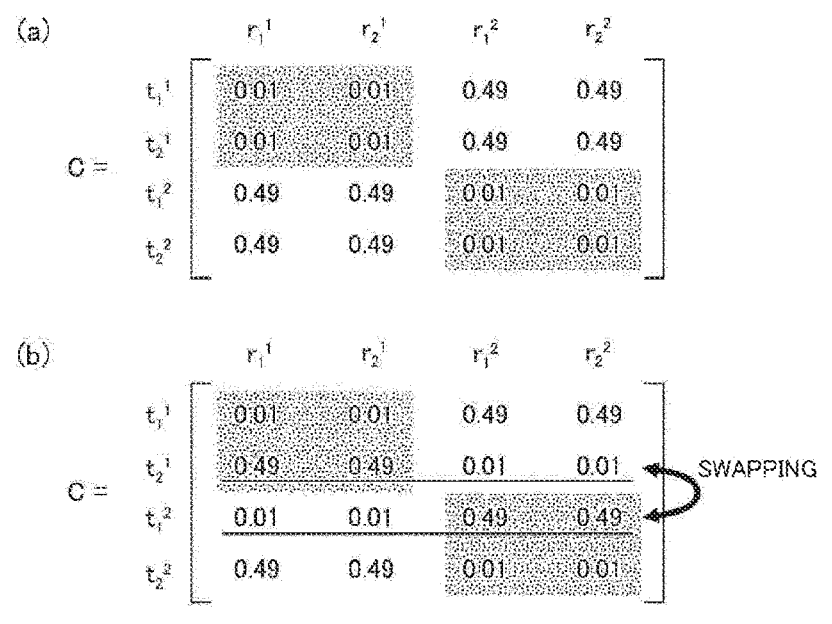

FIG. 3 is a diagram showing an example of the connection probability matrix C of two pairs of sending/receiving ports. FIG. 3(a) shows an example in which the probability of connection to the same FXC switch is low. FIG. 3(b) shows the connection probability matrix C in which the rows of the sending ports $t_2^1$ and $t_1^2$ are swapped.

As shown in FIG. 3(a), when the connection probability of the sending port $t_1^1$ and the receiving port $r_1^1$ of the same switch number is low, the sending port $t_1^1$ and the receiving port $r_1^1$ are connected via the FXC switch of the intermediate layer. In the case of the example shown in FIG. 3(a), the expected value of the number of short paths is D=0.08.

When the optical fibers connected to the sending port $t_h^g$ are swapped, the rows are swapped in the connection probability matrix C. Further, when the optical fibers connected to the receiving port $r_j^1$ are swapped, the columns are swapped in the connection probability matrix C.

Therefore, the expected value D of the number of short paths can be increased by swapping the sending/receiving ports. FIG. 3(b) shows a connection probability matrix C when the optical fiber of the sending port $t_2^1$ and the optical fiber of the sending port $t_1^2$ are swapped and the receiving ports are similarly swapped.

When the sending/receiving ports are swapped as shown in FIG. 3(b), the expected value D of the number of short paths is increased to D=2.0.

It is expressed by the following expression that the expected value D of the number of short paths is maximized.

[Math. 4]

$$\max_{C} D. \tag{5}$$

The operation allowed for the connection probability matrix C is only the swapping of rows and columns. An optimal connection probability matrix obtained by solving the expression (5) is defined as an optimization matrix C*.

Here, the expression (5) is a problem of allocating the sending/receiving port to the FXC switch, and is similar to a problem of setting three or more allocation destinations in the minimum bisection problem. The minimum bisection problem is NPhardness. Therefore, if the scale is large, it is difficult to solve the expression (5) within a practical time in some cases.

Therefore, the solution may be solved by using a greedy algorithm. Further, the problem may be solved by LP relaxation after formulated as an integer programming. Any of these methods may be used.

The optimization unit 20 receives, as inputs, the number k of FXC switches, the number n of sending/receiving ports, and the connection probability matrix C of the sending/receiving ports, and swaps rows and columns of the connection probability matrix C so as to maximize the expected value D in which the connection probability using the short path connecting between the sending/receiving ports connected in the same FXC switch becomes the largest.

The swapping port information output unit 30 outputs the difference information between the connection probability matrix C and the optimization matrix C* in which swapping the rows and the columns are swapped in the optimization unit 20. The difference information is information indicating sending/receiving ports to be swapped.

As described above, the connection optimization device 100 according to the present embodiment is a connection optimization device for optimizing the connection between the FXC switches $P_k$ of the plurality of FXC switches $P_1$ to $P_k$ for switching the connection of the optical fibers, and includes the optimization unit 20 for receiving, as inputs, the number k of FXC switches, the number n of sending/receiving ports, and the connection probability matrix C of the sending/receiving port, and swapping rows and columns of the connection probability matrix C so as to maximize the expected value D in which the connection probability using the short path connecting between the sending/receiving ports connected in the same FXC switch $P_k$ becomes the largest, and the swapping port information output unit 30 for outputting the difference information between the connection probability matrix C and the optimization matrix C* in which swapping the rows and the columns are swapped in the optimization unit 20. Accordingly, the number of FXC switches $P_K$ in the intermediate layer can be reduced, and thus the net cost can be suppressed.

Evaluation Experiment

An evaluation experiment was conducted for the purpose of confirming the effects obtained by the present embodiment.

The evaluation index is defined as "the ease of connection request pattern", and is quantitatively defined as shown by the following expression.

[Math. 5]

$$r(C) = \frac{D(k-1)}{kn - D} \tag{6}$$

The ease of connection r(C) of a certain connection probability matrix C indicates that the larger expected value D represents easier connection and the smaller expected value D represents more difficult connection. When all the connection probabilities $c_h^g$ are equal, the probability is normalized to 1. The case where the value of r(C) is larger than 1 is set to be easy. The case where the value of r(C) is smaller than 1 is set to be difficult.

When the ease of connection of the connection probability matrix C shown in FIG. 3(a) is calculated, r(C)=0.02 is established. This indicates that the short path is difficult to be set.

Therefore, the connection probability matrix C shown in FIG. 4 is considered in which 0.01 and 0.49 of the connection probability of FIG. 3(a) are swapped. The expected value D of the connection probability matrix C is D=3.92 and r(C)=4.9, and it is understood that the short path is easy to be set.

Figure 5:
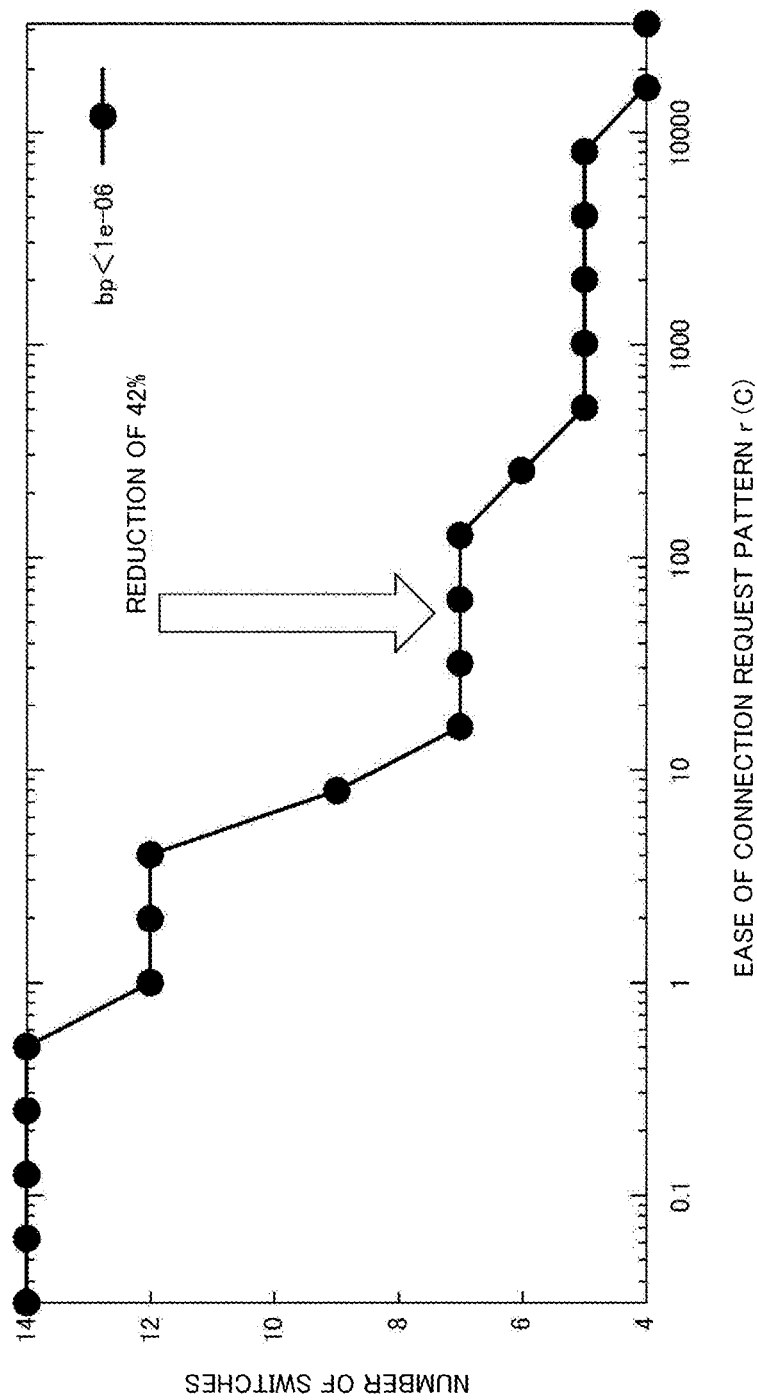
FIG. 5 is a diagram shows an effect of reducing FXC switches using the connection optimization device shown in FIG. 1 for a large network configuration.

FIG. 5 is a diagram showing the effect of reducing the number of FXC switches in the case of the larger network configuration. In FIG. 5, the horizontal axis represents the ease of connection request pattern r(C), and the vertical axis represents the number of FXC switches.

In the large network configuration, the number k of FXC switches is set to k=256 pairs, and the number of pairs of sending/receiving port is set to 1000 pairs.

FIG. 5 shows a characteristic in the case where an allowable occlusion rate bp, which is an allowable probability in which the line (path) cannot be established, is $10^{-6}$. It is understood that 12 pieces of FXC switches are necessary in the case of the uniform connection request pattern r(C)=1, and the number of FXC switches is reduced to 7 (reduction effect of 42%) in the case of r(C)=10 or more.

This is because many paths become short paths and the FXC switches of the intermediate layer can be reduced. On the contrary, when the value of r(C) becomes less than 1, the number of FXC switches in the intermediate layer increases so as to accommodate many paths (lines), and 14 pieces of FXC switches are required.

Figure 6:
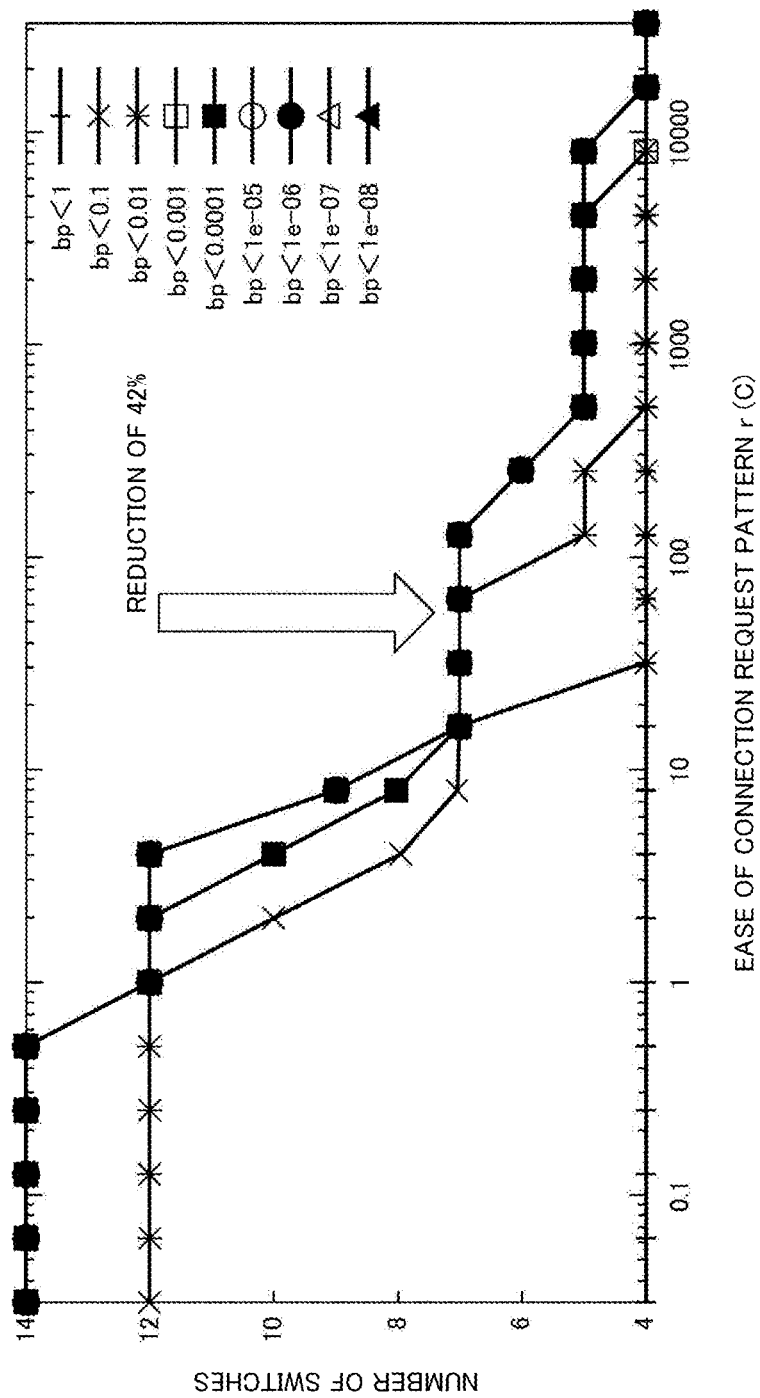
FIG. 6 is a diagram showing the effect of reducing FXC switches using an allowable occlusion rate as a parameter.

FIG. 6 is a diagram showing the effect of reducing the number of FXC switches using the allowable occlusion rate bp as a parameter. It is understood that if the allowable occlusion rate bp is less than or equal to 0.1, the number of FXC switches reduces as the r(C) increases.

Second Embodiment

In the first embodiment, a description has been given regarding the method for optimizing the connection of the sending/receiving ports by setting the number k of FXC switches and the number n of the sending/receiving ports to fixed values. By using the network configuration method described in the prior art literature, k, n can be set to several network configurations of $(k_1, n_1)$, $(k_2, n_2)$, ....

An occlusion rate is calculated for each network configuration by simulation or the like, and the network configuration (k, n) for minimizing the number of FXC switches is selected while satisfying the allowable occlusion rate. In the present embodiment, the first embodiment is applied to the selected network configuration to optimize the connection of the sending/receiving ports.

However, the selected network configuration is not necessarily optimal. Even if the number of FXC switches can be minimized by the initial allocation of the sending/receiving ports, the number of FXC switches may be reversed in the process of optimization.

In other words, the number of FXC switches may be more reduced by optimizing the sending/receiving ports using another network configuration. Therefore, in the present embodiment, optimization is performed by simultaneously using the first embodiment and the conventional network configuration method.

Figure 7:
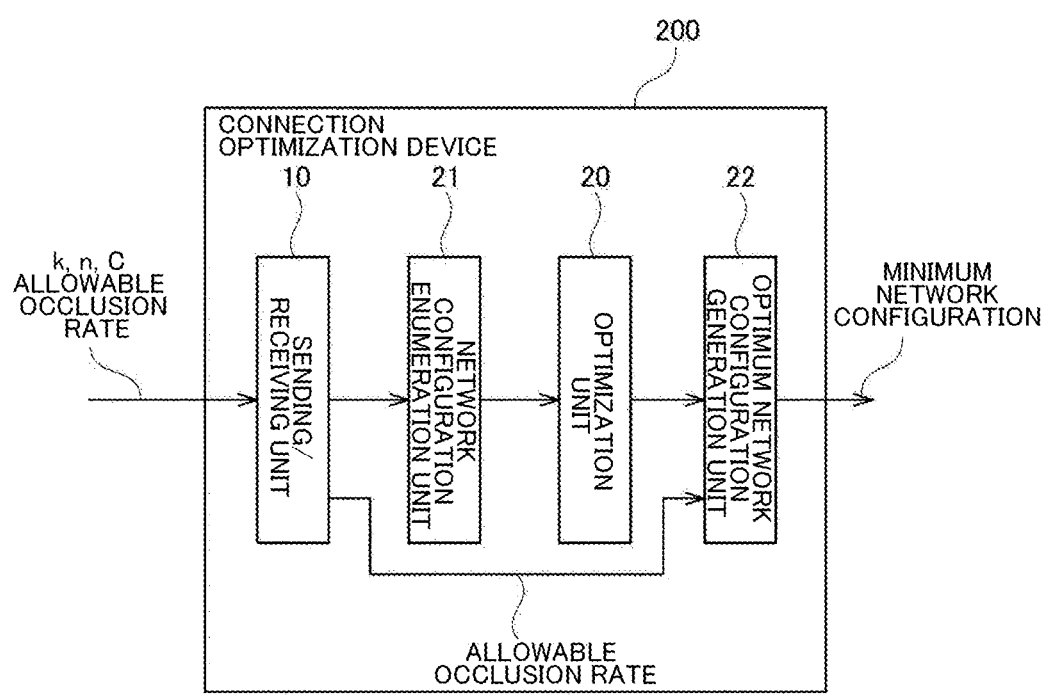
FIG. 7 is a block diagram showing a function configuration example of a connection optimization device according to a second embodiment of the present invention.

FIG. 7 is a block diagram showing a function configuration example of a connection optimization device according to a second embodiment of the present invention. The connection optimization device 200 shown in FIG. 7 is different from the connection optimization device 100 (FIG. 2) in that it includes a network configuration enumeration unit 21 and an optimum network configuration generation unit 22.

The sending/receiving unit 10 receives an allowable occlusion rate representing an allowable value of probability in which lines of optical fibers are not connected in addition to the number k of FXC switches, the number n of sending/receiving ports, and the connection probability matrix C. The optimum network configuration generation unit 22 is provided in place of the swapping port information output unit 30.

The network configuration enumeration unit 21 receives, as inputs, the number k of FXC switches and the number n of receiving ports, and enumerates a plurality of network configurations representing the connection of FXC switches for connecting the sending ports and the receiving ports.

The optimization unit 20 swaps the rows and columns of the connection probability matrix C so as to maximize the expected value D in which the connection probability using the short path becomes the largest for each of the plurality of network configurations.

The optimum network configuration generation unit 22 receives the optimization matrix C* as an input, and generates a minimum network configuration satisfying an allowable occlusion rate representing an allowable value of probability in which lines of optical fibers connecting between users are not connected.

As described above, the connection optimization device 200 according to the present embodiment includes a network configuration enumeration unit 21 for receiving the number k of FXC switches and the number n of sending/receiving ports as inputs and enumerating a plurality of network configurations representing connections of FXC switches for connecting between sending ports and receiving ports, and an optimum network configuration generation unit 22 for receiving the optimization matrix C* as input and generating the minimum network configuration satisfying an allowable occlusion rate representing an allowable value of probability in which lines of optical fibers connecting between users are not connected, in place of the swapping port information output unit 30, and the optimization unit 20 swaps the rows and columns of the connection probability matrix C so as to maximize the expected value D in which the connection probability using the short path becomes the largest for each of the plurality of network configurations. Thus, the optimum network configuration can be generated from the plurality of network configurations.

Connection Optimization Method

Figure 8:
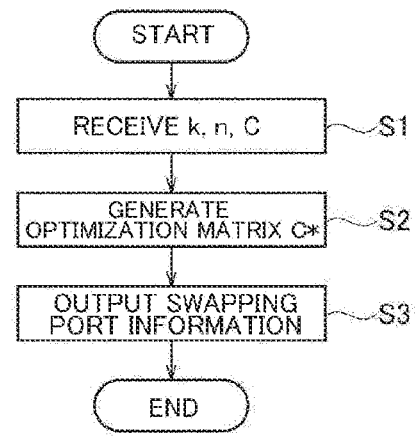
FIG. 8 is a flowchart showing an operation procedure of the connection optimization device shown in FIG. 2.

FIG. 8 is a flowchart showing processing procedures of the connection optimization method performed by the connection optimization device 100 according to the present embodiment. The sending/receiving unit 10 receives the number k of FXC switches, the number n of sending/receiving ports, and the connection probability matrix C (step S1). These k, n, C are acquired from a manager who manages the network.

The optimization unit 20 receives, as inputs, the number k of FXC switches, the number n of sending/receiving ports, and the connection probability matrix C of the sending/receiving ports and swaps the rows and the columns of the connection probability matrix C so as to maximize the expected value D in which the connection probability using the short path connecting between the sending/receiving ports connected in the same FXC switch becomes the largest (step S2). The optimization matrix C* in which the rows and the columns of the connection probability matrix C are swapped is generated.

The swapping port information output unit 30 outputs the difference information between the connection probability matrix C and the optimization matrix C* swappingin which the rows and the columns are swapped in the optimization unit 20 (step S3).

As described above, the connection optimization method according to the present embodiment is a connection optimization method for optimizing the connection between a plurality of FXC switches executed by the connection optimization device 100, and the connection optimization device 100 executes a optimization step S2 of receiving, as inputs, the number k of FXC switches, the number n of sending/receiving ports, and the connection probability matrix C of the sending/receiving port, and swapping the rows and the columns of the connection probability matrix C so as to maximize the expected value D in which the connection probability using the short path connecting between the sending/receiving ports connected in the same FXC switch becomes the largest, and a swapping port information output step S3 of outputting the difference information between the connection probability matrix C and the optimization matrix C* in which the rows and the columns are swapped in the optimization step S2. Accordingly, the number of FXC switches $P_K$ in the intermediate layer can be reduced, and thus the net cost can be suppressed.

Figure 9:
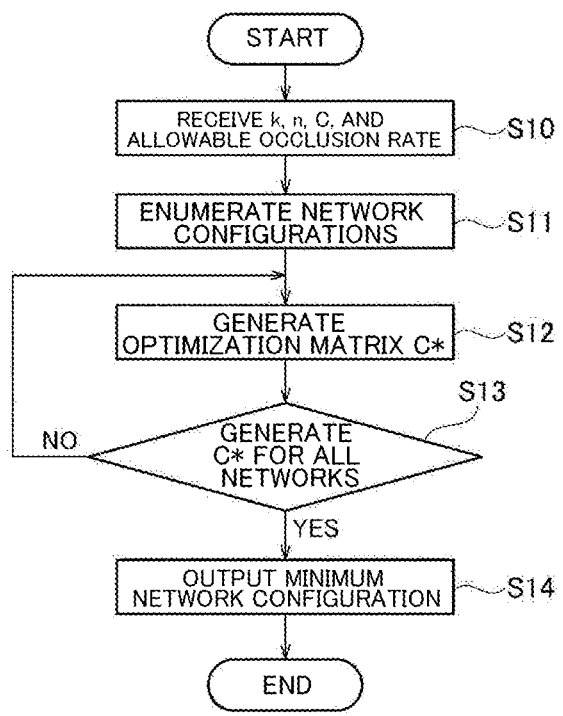
FIG. 9 is a flowchart showing an operation procedure of the connection optimization device shown in FIG. 7.

FIG. 9 is a flowchart showing processing procedures of the connection optimization method performed by the connection optimization device 200 according to the present embodiment. The connection optimization method performed by the connection optimization device 200 is a method for generating the optimal network configuration from among a plurality of network configurations enumerated by the network configuration enumeration unit 21.

The connection optimization method performed by the connection optimization device 200 has been described in the second embodiment. Therefore, the processing procedure is shown in FIG. 9, and the more description is omitted.

Figure 10:
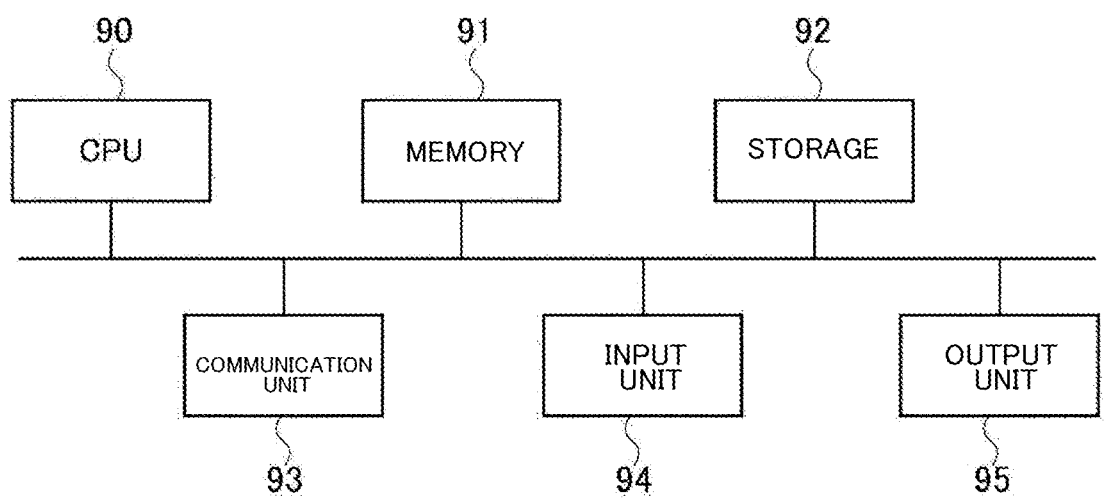
FIG. 10 is a block diagram showing a configuration example of a general-purpose computer system.

The connection optimization device 100 and 200 can be realized by a general-purpose computer system shown in FIG. 10. For example, in the general-purpose computer system including a CPU 90, a memory 91, a storage 92, a communication unit 93, an input unit 94, and an output unit 95, the respective functions of the connection optimization device 100 and 200 are realized when the CPU 90 performs a predetermined program loaded onto the memory 91. The predetermined program may be recorded on a computer-readable recording medium such as an HDD, an SSD, a USB memory, a CD-ROM, a DVD-ROM, or a MO, or may be distributed via a network.

The present invention is not limited to the above embodiment, and can be modified without departing from the scope of the gist of the invention. For example, the difference information between the connection probability matrix C and the optimization matrix C* may be displayed on a display unit (not shown) included in the connection optimization device, or may be outputted to a device for automatically changing the connection.

In this manner, the present invention includes various embodiments etc., not described herein, as a matter of course. Thus, the technical scope of the present invention is only defined by invention specifying matters in the claims that are appropriate from the above description.

REFERENCE SIGNS LIST 1 to 4 Transmission device
10 Sending/receiving unit
20 Optimization unit
21 Network configuration enumeration unit
22 Optimum network configuration generation unit
30 Swapping port information output unit
100, 200 Connection optimization device
k Number of FXC switches
n Number of sending/receiving ports
C Connection probability matrix
C* Optimization matrix

The invention claimed is:

1. A connection optimization device that optimizes connections between a plurality of fiber cross-connects (FXC) switches for switching connections of optical fibers, comprising:

an optimization unit implemented using one or more computing devices, configured to receive, as inputs, a number of the FXC switches, a number of sending/receiving ports and a connection probability matrix of the sending/receiving ports and swap rows and columns of the connection probability matrix so as to maximize an expected value in which a connection probability using a short path connecting between the sending/receiving ports connected in the same FXC switch becomes the largest; and a swapping port information output unit, implemented using one or more computing devices, configured to output difference information between the connection probability matrix and an optimization matrix in which the rows and the columns are swapped in the optimization unit.

2. The connection optimization device according to claim 1, comprising:

a network configuration enumeration unit, implemented using one or more computing devices, configured to receive the number of FXC switches and the number of sending/receiving ports as inputs and enumerate a plurality of network configurations representing connections of the FXC switches for connecting between the sending ports and the receiving ports; and an optimum network configuration generation unit, implemented using one or more computing devices, configured to receive the optimization matrix as input and generate a minimum network configuration that satisfies an allowable occlusion rate representing an allowable value of probability in which lines of the optical fibers connecting between users are not connected, in place of the swapping port information output unit, wherein the optimization unit swaps the rows and the columns of the connection probability matrix so as to maximize the expected value in which the connection probability using the short path becomes the largest for each of the plurality of network configurations.

3. A connection optimization method that optimizes connections between a plurality of fiber cross-connects (FXC) switches executed by a connection optimization device, the connection optimization method comprising:

receiving, as inputs, a number of the FXC switches, a number of sending/receiving ports and a connection probability matrix of the sending/receiving ports and swapping rows and columns of the connection probability matrix so as to maximize an expected value in which a connection probability using a short path connecting between the sending/receiving ports connected in the same FXC switch becomes the largest; and outputting difference information between the connection probability matrix and an optimization matrix in which the rows and the columns are swapped.

4. A non-transitory computer-readable storage medium storing a program for causing a one or more computer to function as the connection optimization device according to claim 1.

* * * * *